US012068148B2

(12) United States Patent
Cooks et al.

(10) Patent No.: US 12,068,148 B2
(45) Date of Patent: Aug. 20, 2024

(54) MASS SPECTROMETERS THAT UTILIZE IONIC WIND AND METHODS OF USE THEREOF

(71) Applicant: Purdue Research Foundation, West Lafayette, IN (US)

(72) Inventors: Robert Graham Cooks, West Lafayette, IN (US); Brett M. Marsh, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/130,474

(22) Filed: Apr. 4, 2023

(65) Prior Publication Data

US 2023/0238233 A1 Jul. 27, 2023

Related U.S. Application Data

(63) Continuation of application No. 17/338,044, filed on Jun. 3, 2021, now Pat. No. 11,646,189.

(60) Provisional application No. 63/035,045, filed on Jun. 5, 2020.

(51) Int. Cl.

*H01J 49/24* (2006.01)
*H01J 49/00* (2006.01)
*H01J 49/16* (2006.01)
*H01J 49/42* (2006.01)

(52) U.S. Cl.

CPC .......... *H01J 49/24* (2013.01); *H01J 49/0031* (2013.01); *H01J 49/16* (2013.01); *H01J 49/4225* (2013.01)

(58) Field of Classification Search

CPC ........ H01J 49/24; H01J 49/0031; H01J 49/16; H01J 49/4225

USPC ...... 250/281, 282, 288, 324; 315/111.9, 111, 315/111.1, 111.8; 313/359, 231, 362

See application file for complete search history.

(56) References Cited

U.S. PATENT DOCUMENTS 3,638,058 A * 1/1972 Fritzius .................. H01T 23/00 361/230
4,210,847 A * 7/1980 Shannon .................. H05H 1/47 315/111.91
7,911,146 B2 * 3/2011 Dunn-Rankin ......... H01T 23/00 315/111.81
8,304,718 B2 11/2012 Ouyang et al.
8,508,908 B2 * 8/2013 Jewell-Larsen .... H05K 7/20172 361/231

OTHER PUBLICATIONS

Fico, 2007, Miniaturization and Geometry Optimization of a Polymer-Based Rectilinear Ion Trap, Anal Chem, 79 (21):8076-8082.
Gao, 2006, Handheld Rectilinear on Trap Mass Spectrometer, Anal Chem. 78:5994-6002.
Gao, 2008, Design and characterization of a multisource handheld tandem mass spectrometer, Anal. Chem., 80:7198-7205.
Hou, 2011, Sampling wand for an ion trap mass spectrometer, Anal Chem., 83:1857-1861.

(Continued)

*Primary Examiner* — Michael Maskell

(74) *Attorney, Agent, or Firm* — Brown Rudnick LLP; Adam M. Schoen

(57) ABSTRACT

The invention generally relates to mass spectrometers that utilize ionic wind and methods of use thereof.

4 Claims, 5 Drawing Sheets

(56) References Cited

OTHER PUBLICATIONS

Li, 2014, Mini 12, Miniature Mass Spectrometer for Clinica and Other Applications-Introduction and Characterization, Analytical Chemistry, 86:2909-2916.
Mulligan, 2006, Desorption electrospray ionization with a portable mass spectrometer: is situ analysis of ambient surfaces, Chem Commun, 1709-1711.
Ouyang, 2009, Handheld Miniature Ion Trap Mass Spectrometers, Anal Chem, 81(7):2421-2425.
Ouyang, 2009, Miniature Mass Spectrometers, Ann Rev Anal Chem, 2:187-214.
Sanders, 2009, Hand-held mass spectrometer for environmentally relevant analytes using a variety of sampling and ionization methods, Euro J Mass Spectrom, 16:11-20.
Sokol, 2011, Miniature mass spectrometer equipped with electrospray and desorption electrospray ionization for direct analysis of organics from solids and solutions, Int J Mass Spectrom, 306:187-195.
Xu, 2010, Miniaturization of Mass Spectrometry Analysis Systems, JALA, 15:433-439.

* cited by examiner

MASS SPECTROMETERS THAT UTILIZE IONIC WIND AND METHODS OF USE THEREOF

RELATED APPLICATION

The present application is a continuation of U.S. nonprovisional application Ser. No. 17/338,044, filed Jun. 3, 2021, which claims the benefit of and priority to U.S. provisional patent application Ser. No. 63/035,045, filed Jun. 5, 2020, the content of each of which is incorporated by reference herein in its entirety.

FIELD OF THE INVENTION

The invention generally relates to mass spectrometers that utilize ionic wind and methods of use thereof.

BACKGROUND

Mass spectrometry is one of the most widely utilized methods for chemical analysis in both laboratory and field settings. In particular, field usable instruments have become quite common since 2000, with many different analyzers, ion sources, and form factors. Despite the wide range of instrument types, a significant limitation to further decrease in size and weight of such devices is often the vacuum pump and its power supply. Most field usable mass spectrometers use a mechanical pump in conjunction with a turbomolecular pump to achieve pressures suitable for mass analysis and detector operation. Although such pumps are effective and commercially available, such pumps add weight, increase power consumption and add complexity through their multiple consumable items. Indeed, pumping is the primary energy draw on miniature instruments. Discontinuous atmospheric pressure interfaces (U.S. Pat. No. 8,304,718) reduce pumping requirements but have disadvantages in terms of instrument duty cycle.

SUMMARY

The invention provides an approach for creating a vacuum within a small volume of a mass spectrometer or other device using a novel pump with no moving parts. Here, a flow of gas generated by a corona (or similar) discharge to a grounded grid, commonly referred to as the “ionic wind,” is used to produce a region of lower pressure. This can be done either directly, by using the momentum of the ionized gas to create a vacuum in its path, or indirectly to create such a vacuum in a neighboring region by the Venturi effect. In contrast to traditional vacuum pumps this device has no moving parts and only requires a single power supply for operation. Furthermore, the motion of the gas can be such as to establish a pressure gradient within the device so that there is need be no exhaust system. The invention further simplifies mass spectrometry systems and allows for a parsimonious ‘vacuum-on-demand-where-needed” mode of operation. Such a device can be produced by adding low mass elements into virtually any instrument.

In certain aspects, the invention provides a mass spectrometer including an ion trap in which a vacuum pressure in the ion trap is generated by ionic wind. In certain embodiments, the mass spectrometer does not include an exhausting pump. In certain embodiments, the mass spectrometer may additionally include an ion source that is part of the mechanism that generates the ionic wind or is entirely separate from the mechanism that generates the ionic wind (i.e., a standalone ion source).

In certain embodiments, the ionic wind is generated by an ionic wind pump that is separate from and operably coupled to the mass spectrometer. For example, the ionic wind pump may include a corona discharge source, a ground, wherein the ground is spaced apart and distal to the corona discharge source, and an outlet distal to the ground, the outlet narrowing from a proximal end to a distal end. In certain embodiments, the outlet is integrally formed to the ionic wind pump. In certain embodiments, the outlet is a separate connectable part to the ionic wind pump.

In certain embodiments, a ground mesh grid is coupled to a distal end of the ion trap and the ionic wind is generated due to interaction between one or more corona discharge sources external the ion trap and the ground mesh grid such that a vacuum pressure is produced within the ion trap.

In another aspect, the invention provides method for analyzing an analyte, that involve generating a vacuum pressure in a mass spectrometer via ionic wind, introducing ions of an analyte into the mass spectrometer, and analyzing the ions in the mass spectrometer.

In certain embodiments, the ionic wind is generated by an ionic wind pump that is separate from and operably coupled to the mass spectrometer. In certain embodiments, the ions of the analyte are generated by the ionic wind pump. In other embodiments, the ions of the analyte are generated by a separate ion source.

In certain embodiments, the ionic wind is generated due to interaction between one or more corona discharge sources external to the mass spectrometer and a ground mesh grid that is coupled to a distal end of the ion trap. In certain embodiments, the ions of the analyte are generated via the one or more corona discharge sources. In other embodiments, the ions of the analyte are generated by a separate ion source.

Another aspect of the invention provides an ionic wind pump that includes a ionic wind pump, a corona discharge source, a ground, wherein the ground is spaced apart and distal to the corona discharge source, and an outlet distal to the ground, the outlet narrowing from a proximal end to a distal end. In certain embodiments, the outlet is integrally formed to the ionic wind pump. In certain embodiments, the outlet is a separate connectable part to the ionic wind pump. In certain embodiments, ground comprises a metal mesh. In certain embodiments, the corona discharge source comprises a corona discharge wire.

Another aspect of the invention provides a mass spectrometer coupled to an ionic wind pump. Another aspect of the invention provides a method of analyzing an analyte that involves providing a mass spectrometer coupled to an ionic wind pump, and generating ions of an analyte that are analyzed in the mass spectrometer. Another aspect of the invention provides a system including one or more corona discharge sources, and a mass spectrometer comprising an ion trap and a ground mesh grid coupled to a distal end of the ion trap, wherein the system is configured such that an ionic wind is generated between the one or more corona discharge sources and the ground mesh grid that produces a vacuum pressure within the ion trap.

DETAILED DESCRIPTION

The invention provides the use of the ionic wind to create a vacuum in a particular region of a container (e.g., an ion trap of a mass spectrometer) by moving gas within the container (e.g., ion trap) but without necessarily exhausting the gas as is done using conventional pumps. The invention finds particular use with mass spectrometers and in particular, mass analyzers and ion detectors.

Figure 1:
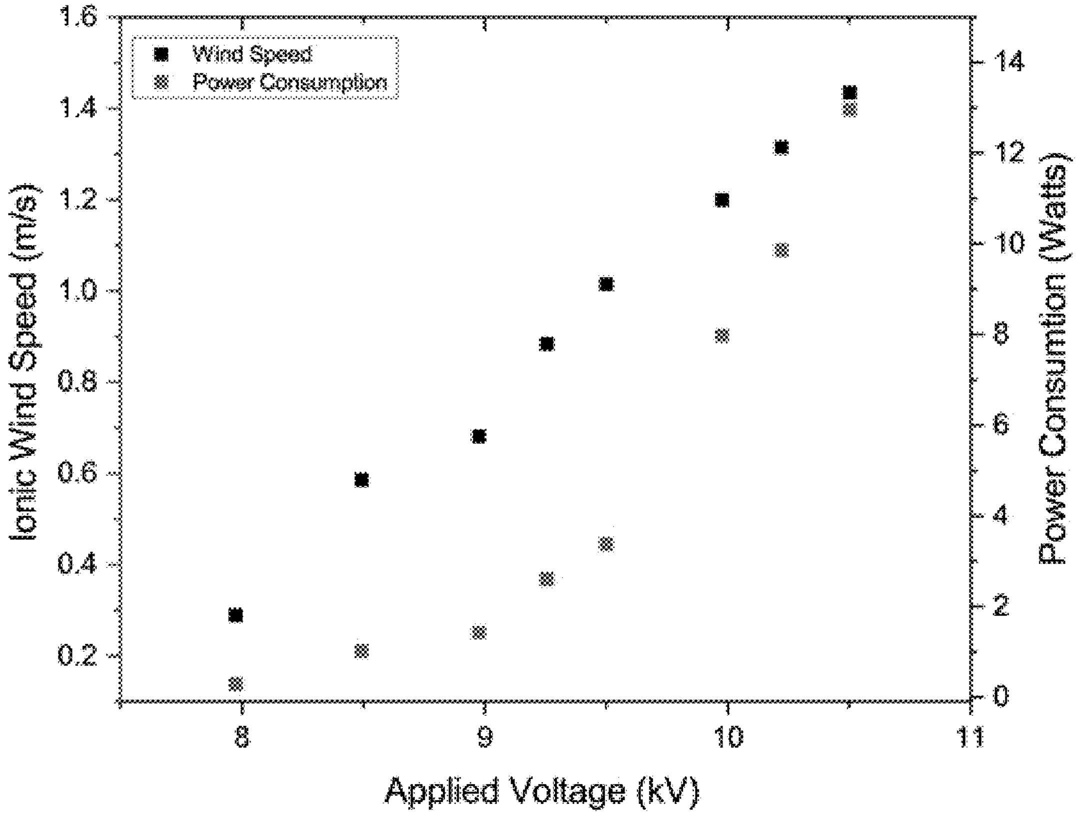
FIG. 1 is a graph showing pumping speed and power consumption with applied voltage.

The invention herein is based on the principle of the ionic wind. Briefly, the ionic wind is a result of ions moving from a corona discharge to a grounded surface. The high electric field of the corona discharge imparts significant momentum to the generated ions and this momentum is transferred by collisions with background gas molecules, resulting in movement of this body of gas. This movement is highly directional, flowing from high voltage towards the lower voltage electrode. Several versions of devices to generate ionic wind have been developed, with wire-to-grid, and needle-to-grid geometries most common. The speeds of the winds generated by this technique are dependent upon the voltages and geometries of the device but generally range from 0.5 m/s to 1.5 m/s (FIG. 1).

Ionic wind is further described for example in U.S. Pat. Nos. 4,210,847; 8,508,908; and 3,638,058, the content of each of which is incorporated by reference herein in its entirety.

Figure 2:
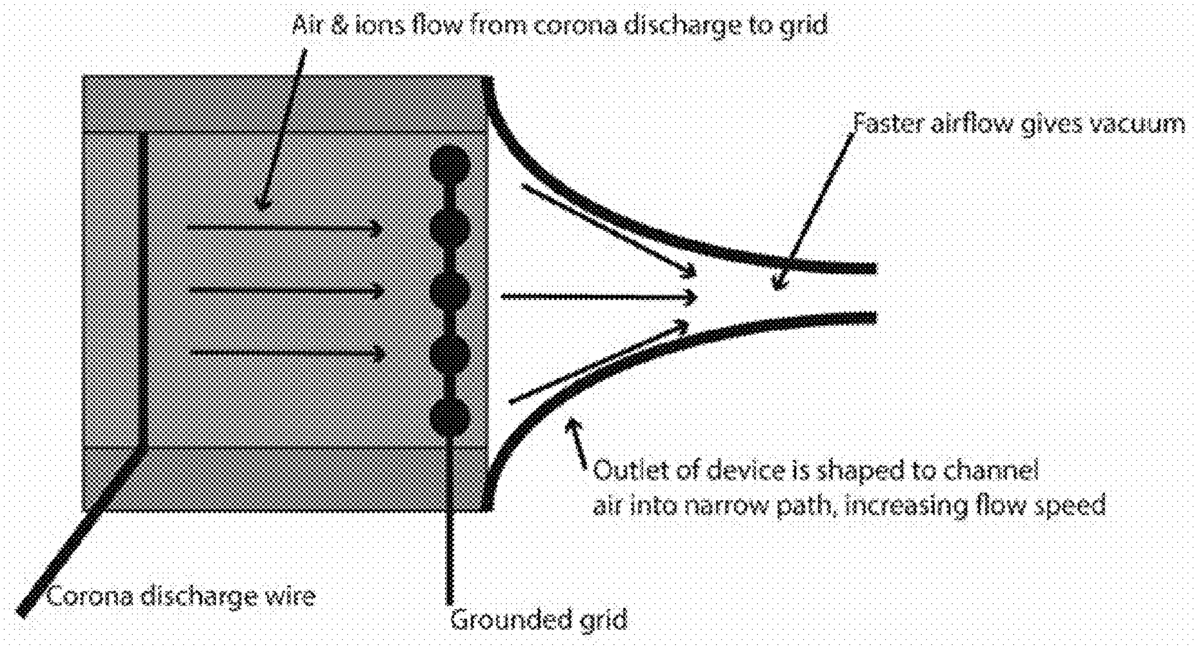
FIG. 2 is a schematic view of an ionic wind pumping scheme. In one mode of operation (closed system) the gas removed by the action of the ionic wind is continuously replaced by movement of gas within the system to the low-pressure region(s) so maintaining a steady state non-uniform pressure.

The invention takes advantage of ionic wind for use in a vacuum pump. For example, the invention can be used to create non-homogeneous distributions of pressure within a closed volume as here proposed. Once the ionic wind is generated, it can be channeled through an appropriately designed passage which narrows from the diameter of the ionic wind generating device to an appropriate diameter. The diameter of this opening is given by the equations which describe the Venturi effect, in which the speed of airflow of a constant volume of air is related to its pressure. An example of the principle of operation of such a device is shown in FIG. 2. The device may also be used directly to pump out a volume as a substitute for a conventional vacuum pump, by placing the volume to be pumped out behind the corona discharge source. In this way the air will be ionized and an air current will be produced.

One application of this system is to a mass spectrometer operated without any exhausting vacuum pump. The mass spectrometer, for example, may be at high pressure (at or near ambient pressure) but particular regions in the instrument would be at lower pressure. These lower pressures might be needed for operation of the mass analyzer or the ion detector.

Figure 3:
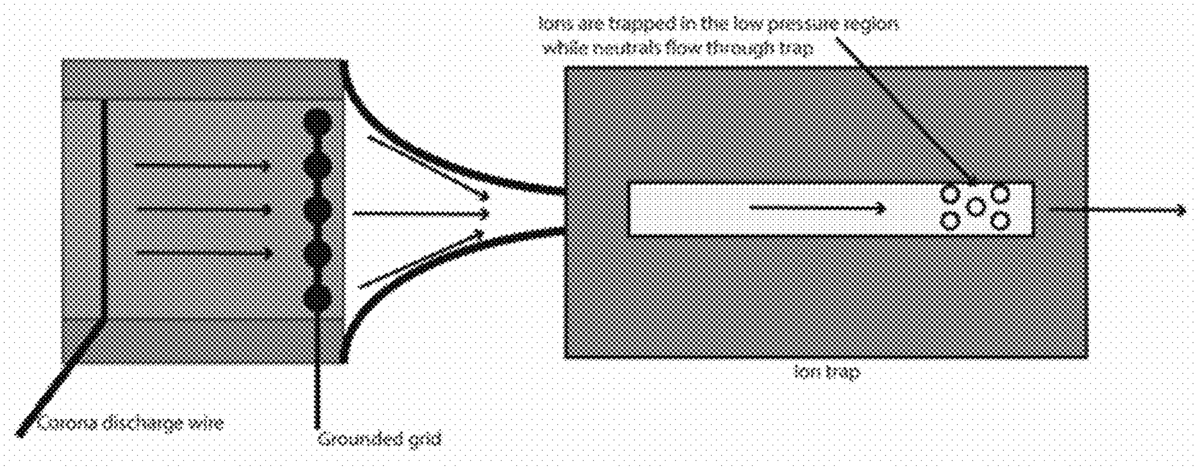
FIG. 3 illustrates an ionic wind pump as shown in FIG. 2 operable coupled to an ion trap of a mass spectrometer.

The ionic wind can be channeled longitudinally through the center of a linear quadrupole ion trap, resulting in a lower pressure than the ambient environment. Ions carried by the wind, generated either in the wind or by an independent method (e.g., independent ion source), can be electrostatically trapped in the device. The operation of the rf ion trap can be such that unwanted ions of the wind itself are unstable so not trapped whereas other ions can be trapped in the quadrupole ion trap. The ions can then be ejected mass-selectively at particular well-defined times from the trap by traditional ion trap scanning methods (FIG. 3). The ions will be detected by a suitable detector, such as a Faraday cup and a mass spectrum can be recorded.

In other embodiments, instead of using a Faraday cup, the ejected ions may instead be detected using an electron multiplier, for example a dynode electron multiplier as used in the Mini 12 mass spectrometer (Li et al., Analytical Chemistry 2014, 86, 2909-2916, the content of which is incorporated by reference herein in its entirety). This method of detection uses low pressure in the regions in which electron/surface collisions occur. This can be achieved by setting up an ionic wind to create the appropriate gas flow. This can be done by using the ionic wind to directly affect gas flow in the detector volume, which is undesirable because of possible ion/electron interaction affecting electron current measurements, or by a Venturi process. Alternatively, a stand-alone ionic wind Venturi tube with a piece of tubing connected to the detector volume may be able to induce appropriate vacuum.

Figure 4:
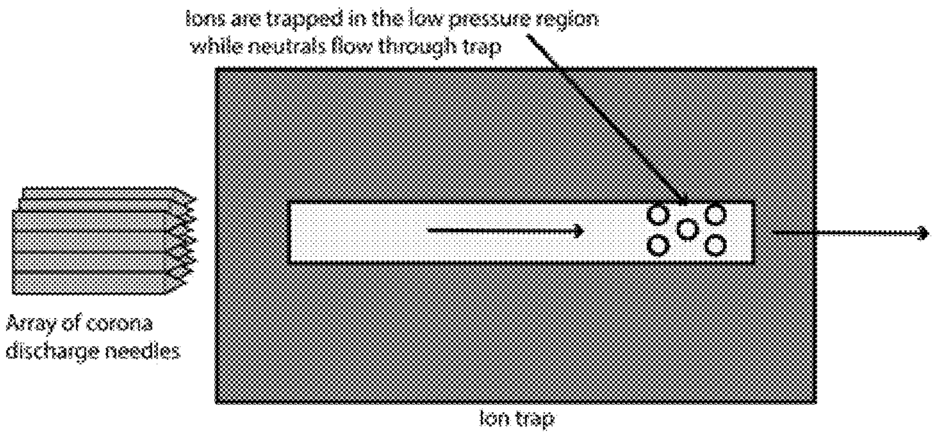
FIG. 4 is a schematic showing mass analysis by corona discharge with an ion trap that includes a mesh so that ionic wind can be generated in the ion trap without a separate ionic wind pump.

In another embodiment as shown in FIG. 4, the ionic wind can be incorporated into the ion trap structure rather than being fabricated into a separate 'pump' as illustrated in FIGS. 2-3. Both longitudinal and transverse direct mass transfer versions are possible. For reasons of avoiding interactions of the ions due to the ionic wind with the signal carrying ions, longitudinal method might be best. One approach is the use of multiple (12 illustrated in FIG. 4) corona tips at the entrance to the ion trap and a high transparency grid at the exit. The trap would be operated (in the case of air as the gas) with a low mass cutoff of m/z 33 to avoid retaining nitrogen and oxygen ions but to allow them to acquire kinetic energy and induce mass transfer. The corona discharge could be used to generate ions of the opposite polarity of the ions of interest. The ions of interest are the only ions which will be analyzed, while the interaction of opposite polarity ions will serve to reduce the space charge in the trap. Ions of interest would enter the ion trap through a narrow aperture from either an internal or external ionization source. The trap would be operated in the RF only mode although a continuous DC gradient (using materials of appropriate resistivity) would be of interest as a route to more effective mass transfer.

Ionic Wind

Ionic wind is the creation of movement of air, or other fluids, by means of a corona discharge. A corona discharge is a discharge in air between a highly curved electrode and a less curved, or even plane electrode. It is characterized by high voltage, but low current. If the voltage is raised too high, it converts into a spark. Thus there is a limited range of power over which it operates.

A corona discharge takes place between an electrode with a sharply curved surface, e.g., a point or a fine wire, and a larger, less curved surface, or even a plane. The point or wire is called the emitter electrode, and can be charged either negatively or positively. The other electrode is called the collector electrode, and is grounded. The corona is a form of glow discharge in which, except for a small region around the emitter, the current is carried entirely by ions. Voltages are in the 10 to 50 kV range in atmospheric pressure air. The small size of the emitter creates a very large local electric field in the vicinity of the tip or the wire, of the order of 107 V/m. Such high fields give rise to field emission of electrons. If the emitter is positively charged, the electrons will return to the emitter, but in the process, they will undergo collisions with air molecules, creating positively charged ions. These ions will be repelled by the emitter, and be attracted to the collector. In their passage to the collector, ions will impact air molecules, giving them momentum, and thereby generating the ionic wind. The region in which the ions are created is very small compared with the distance between the emitter and the collector, so that most of the discharge region is dominated by ion current. The thickness, δ (mm), of the ionization region can be calculated from:

$$\delta=\sqrt{a}$$

where a (mm) is the radius of the wire, or tip radius of a point. If the applied voltage is raised too much, and approaches the spark-breakdown voltage for that gap, the glow discharge will change into a spark.

It has been shown that the thrust generated by the ionic wind in air, T (Newtons), can be written as:

$$T=I\,d/\mu$$

where I=current in the discharge (amps), d is the gap between emitter and collector electrodes (metres), and μ the ion mobility (m2/V-sec). Given the thrust, the thrust per unit power, θ, is:

$$\begin{aligned}\theta &= T/1V\\ &= (d/V)/\mu\\ &= 1/E\mu\end{aligned}$$

in which V is the applied voltage, and E the average electric field, defined as E=V/d.

The mobility of air is known, and depends on humidity, but only varies from a value of $2.15\times10^{-4}$ $m^2$/V-sec for dry air to $1.6\times10^{-4}$ for saturated air. It can be assumed that the electric field is uniform in the main part of the corona discharge, with an applied voltage of V (volts). Since no more ions are created once the ions have left the high field region around the tip, the product of ion density, $n_i$ and discharge cross-section, A, will be constant. Every ion will experience an electrostatic force, $T_i$, given by $$T_i=eE$$

where e is the unit charge, and of course there is an equal and opposite force on the electrodes. The total force of all the ions on the electrodes is then $$T=NT_i=NeE$$

in which N, the total number of ions in the discharge, is simply N=ni A d. The discharge current is given by $$I=n_iev_iA$$

where vi is the average ion velocity, which is given by vi=μE. It follows that the total force on the electrodes is:

$$\begin{aligned}T &= N\,e\,E\\ &= n_iAd\,e\,E\end{aligned}$$

-continued $$\begin{aligned}&= (n_ie\,v_i\,A)\,dE/\mu E\\ &= I\,d/\mu\end{aligned}$$

in agreement with the above equations. This shows that the thrust force associated with the ionic wind is simply electrostatic repulsion of the anode by, and attraction of the cathode to, the cloud of ions in the discharge. The velocity of the ions in the derivation above was dependent on the ion mobility, which is determined by collisions of the ions with the air through which they are travelling. The ionic wind itself is created at each collision of an ion with an air molecule, which impedes the motion of the ion towards the cathode, and accelerates the air towards the cathode. A simple model of the collisions will illustrate this. The ions are in a uniform field, and so will accelerate at a constant acceleration, a, given by;

$$a=eE/m_i$$

where mi is the mass of the ion. After a distance λ, i.e., the mean free path of the ions in air, the ion will collide with an air molecule. If it is further assumed that in this collision the ion is brought to rest, and the air molecule is given all the momentum that the ion had prior to the collision, then the ion will have traveled the distance λ in a time t such that:

$$\lambda=at^2/2$$

and the average velocity of the ion is $$\begin{aligned}v_i &= \lambda/t\\ &= at/2\\ &= (e\,E/2\,m_i)\sqrt{2\,m_i\,\lambda/eE}\\ &= E\sqrt{e\,\lambda/2\,m_i\,E}\end{aligned}$$

but $v_i$/E is the mobility μ, so that $$\mu=\sqrt{e\lambda/2m_iE}$$

The result that μ is proportional to the inverse square root of the field agrees with results for ions in air at high electric field. In travelling the distance d between emitter and collector, each ion will undergo d/λ collisions. At each collision the ion has momentum $2m_iv_i$, which it gives to the air molecule. This assumes head-on collisions of equal mass ions and air molecules. Thus the total momentum given to the air per second, i.e., the force accelerating the air, F, is:

$$F=n2m_iv_id/\lambda$$

in which n is the number of ions arriving at the collector per second, =I/e. Inserting this for $v_i$, the force accelerating the air is:

$$F=Id\sqrt{2m_iE/e\lambda}$$

and using the equations herein $$F=Id/\mu$$

Thus, it is seen that the force accelerating the air, i.e., the momentum given to the ionic wind, is the same as the thrust on the electrodes, which is itself the reaction to the electrostatic force on the ions.

Mass Spectrometers

In certain embodiments, the systems of the invention may be interfaced with a mass spectrometer, such as a bench-top or miniature mass spectrometer, such as described for example in Gao et al. (Z. Anal. 15 Chem. 2006, 78, 5994-6002), Gao et al. (Anal. Chem., 80:7198-7205, 2008), Hou et al. (Anal. Chem., 83:1857-1861, 2011), Sokol et al. (Int. J. Mass Spectrom., 2011, 306, 187-195), Xu et al. (JALA, 2010, 15, 433-439); Ouyang et al. (Anal. Chem., 2009, 81, 2421-2425); Ouyang et al. (Ann. Rev. Anal. Chem., 2009, 2, 187-25 214); Sanders et al. (Euro. J. Mass Spectrom., 2009, 16, 11-20); Gao et al. (Anal. Chem., 2006, 78(17), 5994-6002); Mulligan et al. (Chem. Com., 2006, 1709-1711); and Fico et al. (Anal. Chem., 2007, 79, 8076-8082), the content of each of which is incorporated herein by reference in its entirety.

An exemplary miniature mass spectrometer is described, for example in Gao et al. (Anal. Chem. 2008, 80, 7198-7205), the content of which is incorporated by reference herein in its entirety. In comparison with the pumping system used for lab-scale instruments with thousands of watts of power, miniature mass spectrometers generally have smaller pumping systems, such as a 18 W pumping system with only a 5 L/min (0.3 m3/hr) diaphragm pump and a 11 L/s turbo pump for the system described in Gao et al. Other exemplary miniature mass spectrometers are described for example in Gao et al. (Anal. Chem., 2008, 80, 7198-7205), Hou et al. (Anal. Chem., 2011, 83, 1857-1861), PCT/US17/26269 to Purdue Research Foundation, and Sokol et al. (Int. J. Mass Spectrom., 2011, 306, 187-195), the content of each of which is incorporated herein by reference in its entirety.

System Architecture

In certain embodiments, the systems and methods of the invention can be carried out using automated systems and computing devices. Specifically, aspects of the invention described herein can be performed using any type of computing device, such as a computer, that includes a processor, e.g., a central processing unit, or any combination of computing devices where each device performs at least part of the process or method. In some embodiments, systems and methods described herein may be controlled using a hand-held device, e.g., a smart tablet, or a smart phone, or a specialty device produced for the system.

Systems and methods of the invention can be performed using software, hardware, firmware, hardwiring, or combinations of any of these. Features implementing functions can also be physically located at various positions, including being distributed such that portions of functions are implemented at different physical locations (e.g., imaging apparatus in one room and host workstation in another, or in separate buildings, for example, with wireless or wired connections).

Processors suitable for the execution of computer program include, by way of example, both general and special purpose microprocessors, and any one or more processor of any kind of digital computer. Generally, a processor will receive instructions and data from a read-only memory or a random access memory or both. The essential elements of computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, solid state drive (SSD), and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having an I/O device, e.g., a CRT, LCD, LED, or projection device for displaying information to the user and an input or output device such as a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected through network by any form or medium of digital data communication, e.g., a communication network. For example, the reference set of data may be stored at a remote location and the computer communicates across a network to access the reference set to compare data derived from the female subject to the reference set. In other embodiments, however, the reference set is stored locally within the computer and the computer accesses the reference set within the CPU to compare subject data to the reference set. Examples of communication networks include cell network (e.g., 3G or 4G), a local area network (LAN), and a wide area network (WAN), e.g., the Internet.

The subject matter described herein can be implemented as one or more computer program products, such as one or more computer programs tangibly embodied in an information carrier (e.g., in a non-transitory computer-readable medium) for execution by, or to control the operation of, data processing apparatus (e.g., a programmable processor, a computer, or multiple computers). A computer program (also known as a program, software, software application, app, macro, or code) can be written in any form of programming language, including compiled or interpreted languages (e.g., C, C++, Perl), and it can be deployed in any form, including as a stand-alone program or as a module, component, subroutine, or other unit suitable for use in a computing environment. Systems and methods of the invention can include instructions written in any suitable programming language known in the art, including, without limitation, C, C++, Perl, Java, ActiveX, HTML5, Visual Basic, or JavaScript.

A computer program does not necessarily correspond to a file. A program can be stored in a file or a portion of file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

A file can be a digital file, for example, stored on a hard drive, SSD, CD, or other tangible, non-transitory medium. A file can be sent from one device to another over a network (e.g., as packets being sent from a server to a client, for example, through a Network Interface Card, modem, wireless card, or similar).

Writing a file according to the invention involves transforming a tangible, non-transitory computer-readable medium, for example, by adding, removing, or rearranging particles (e.g., with a net charge or dipole moment into patterns of magnetization by read/write heads), the patterns then representing new collocations of information about objective physical phenomena desired by, and useful to, the user. In some embodiments, writing involves a physical transformation of material in tangible, non-transitory computer readable media (e.g., with certain optical properties so that optical read/write devices can then read the new and useful collocation of information, e.g., burning a CD-ROM). In some embodiments, writing a file includes transforming a physical flash memory apparatus such as NAND flash memory device and storing information by transforming physical elements in an array of memory cells made from floating-gate transistors. Methods of writing a file are well-known in the art and, for example, can be invoked manually or automatically by a program or by a save command from software or a write command from a programming language.

Suitable computing devices typically include mass memory, at least one graphical user interface, at least one display device, and typically include communication between devices. The mass memory illustrates a type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory, or other memory technology, CD-ROM, digital versatile disks (DVD) or other optical storage, magnetic cassettes, magnetic tape, magnetic disk storage or other magnetic storage devices, Radiofrequency Identification tags or chips, or any other medium which can be used to store the desired information and which can be accessed by a computing device.

As one skilled in the art would recognize as necessary or best-suited for performance of the methods of the invention, a computer system or machines of the invention include one or more processors (e.g., a central processing unit (CPU) a graphics processing unit (GPU) or both), a main memory and a static memory, which communicate with each other via a bus.

Figure 5:
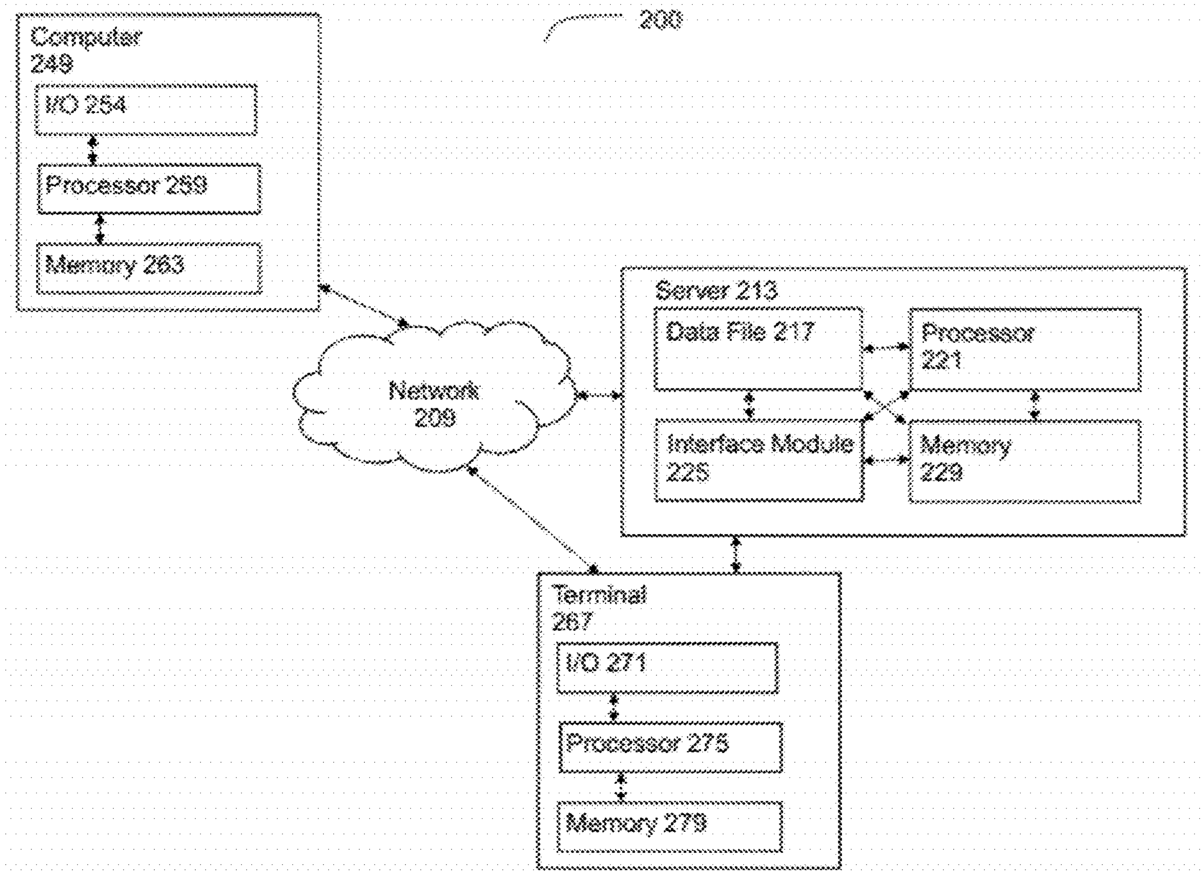
FIG. 5 is an illustration showing an exemplary data analysis module for implementing the systems and methods of the invention in certain embodiments.

In an exemplary embodiment shown in FIG. 5, system 200 can include a computer 249 (e.g., laptop, desktop, or tablet). The computer 249 may be configured to communicate across a network 209. Computer 249 includes one or more processor 259 and memory 263 as well as an input/output mechanism 254. Where methods of the invention employ a client/server architecture, steps of methods of the invention may be performed using server 213, which includes one or more of processor 221 and memory 229, capable of obtaining data, instructions, etc., or providing results via interface module 225 or providing results as a file 217. Server 213 may be engaged over network 209 through computer 249 or terminal 267, or server 213 may be directly connected to terminal 267, including one or more processor 275 and memory 279, as well as input/output mechanism 271.

System 200 or machines according to the invention may further include, for any of I/O 249, 237, or 271 a video display unit (e.g., a liquid crystal display (LCD) or a cathode ray tube (CRT)). Computer systems or machines according to the invention can also include an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem.

Memory 263, 279, or 229 according to the invention can include a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

The invention may be embodied in other specific forms without departing from the spirit or essential characteristics thereof. The foregoing embodiments are therefore to be considered in all respects illustrative rather than limiting on the invention described herein.

What is claimed is:

1. An ionic wind pump, the pump comprising:

a pump housing comprising an open distal end, wherein the pump housing does not comprise an electrode;

a corona discharge source within the pump housing;

a ground metal mesh also within the pump housing, wherein the ground metal mesh is spaced apart and distal to the corona discharge source; and an outlet distal to the ground metal mesh and the open distal end of the pump housing, the outlet narrowing from a proximal end to a distal end.

2. The ionic wind pump of claim 1, wherein the outlet is integrally formed to the ionic wind pump.

3. The ionic wind pump of claim 1, wherein the outlet is a separate connectable part to the ionic wind pump.

4. The ionic wind pump of claim 1, wherein the corona discharge source comprises a corona discharge wire.

* * * * *